(12) United States Patent
Salvatori et al.

(10) Patent No.: US 7,290,885 B2
(45) Date of Patent: Nov. 6, 2007

(54) USER-INTERFACE FOR PROJECTION DEVICES

(75) Inventors: Phillip H. Salvatori, Salem, OR (US); R. David Woolf, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 142 days.

(21) Appl. No.: 11/126,940

(22) Filed: Mar. 16, 2005

(65) Prior Publication Data

US 2005/0259231 A1   Nov. 24, 2005

Related U.S. Application Data

(63) Continuation-in-part of application No. 10/438,612, filed on May 14, 2003, now Pat. No. 6,935,754.

(51) Int. Cl.
| | |
|---|---|
| G03B 21/14 | (2006.01) |
| G03B 21/22 | (2006.01) |
| G03B 21/26 | (2006.01) |
| G03B 21/00 | (2006.01) |
| G09G 5/00 | (2006.01) |
| G09G 3/36 | (2006.01) |
| H04N 7/14 | (2006.01) |

(52) U.S. Cl. .................. 353/36; 353/119; 353/121; 345/5; 345/87; 348/14.07

(58) Field of Classification Search ............... 353/119, 353/30–31, 36, 62–63, 121; 345/5, 87, 705, 345/708–711, 716, 730, 721–722; 348/14.07
See application file for complete search history.

(56) References Cited

U.S. PATENT DOCUMENTS

| | | | |
|---|---|---|---|
| 4,431,282 A | 2/1984 | Boser | |
| 4,452,518 A * | 6/1984 | Di Gianfilippo et al. | ..... 353/25 |
| 5,461,437 A | 10/1995 | Tanaka et al. | |
| 5,526,011 A | 6/1996 | Hix et al. | |
| 5,736,975 A * | 4/1998 | Lunetta | ..... 345/156 |
| 5,767,897 A | 6/1998 | Howell | |
| 5,859,623 A | 1/1999 | Meyn et al. | |
| 5,944,404 A | 8/1999 | Pagano et al. | |
| 5,990,931 A | 11/1999 | Nimri et al. | |
| 6,196,687 B1 | 3/2001 | Smith | |
| 6,305,805 B1 * | 10/2001 | Liebenow | ..... 353/69 |
| 6,481,855 B2 | 11/2002 | Oehler | |
| 6,511,187 B1 | 1/2003 | Salerno et al. | |
| 6,626,543 B2 | 9/2003 | Derryberry | |
| 6,735,616 B1 | 5/2004 | Thompson et al. | |
| 6,916,098 B2 * | 7/2005 | Salvatori et al. | ..... 353/122 |
| 2002/0036694 A1 * | 3/2002 | Merril | ..... 348/220 |

* cited by examiner

*Primary Examiner*—Diane Lee
*Assistant Examiner*—Magda Cruz
(74) *Attorney, Agent, or Firm*—Alleman Hall McCoy Russell & Tuttle LLP

(57) ABSTRACT

The present disclosure provides a projector assembly including a projection device adapted to project an image, and a user-interface in communication with the projection device. The user-interface may be adapted to privately present user-readable information to a user.

21 Claims, 3 Drawing Sheets

USER-INTERFACE FOR PROJECTION DEVICES

The present application is a continuation-in-part of, and claims the benefit of U.S. patent application Ser. No. 10/438,612, filed on May 14, 2003 now U.S. Pat. No. 6,935,754, titled "USER-INTERFACE FOR A PROJECTION DEVICE", the entire contents of which are hereby incorporated by this reference for all purposes.

TECHNICAL FIELD

The present disclosure relates to projection devices. More specifically, the present disclosure relates to methods and apparatus for accessing projector status information.

BACKGROUND

Projectors are widely used to enable effective presentation of images to an audience. However, using a projector can be frustrating, as users typically have to project an image in order to obtain status information about the projector. This configuration may require a user to interrupt or delay a presentation in order to trouble-shoot a problem, change the projector's settings, or ascertain the current settings. It would be desirable to have a projector that allows a user to privately access projector status information without having to project an image or interrupt a presentation.

SUMMARY

In a first embodiment, the present disclosure provides a projector assembly including a projection device adapted to project an image and a user-interface in communication with the projection device. Typically, the user-interface is adapted to privately present projection device status information to a user and receive input information from the user.

DETAILED DESCRIPTION

Figure 1:
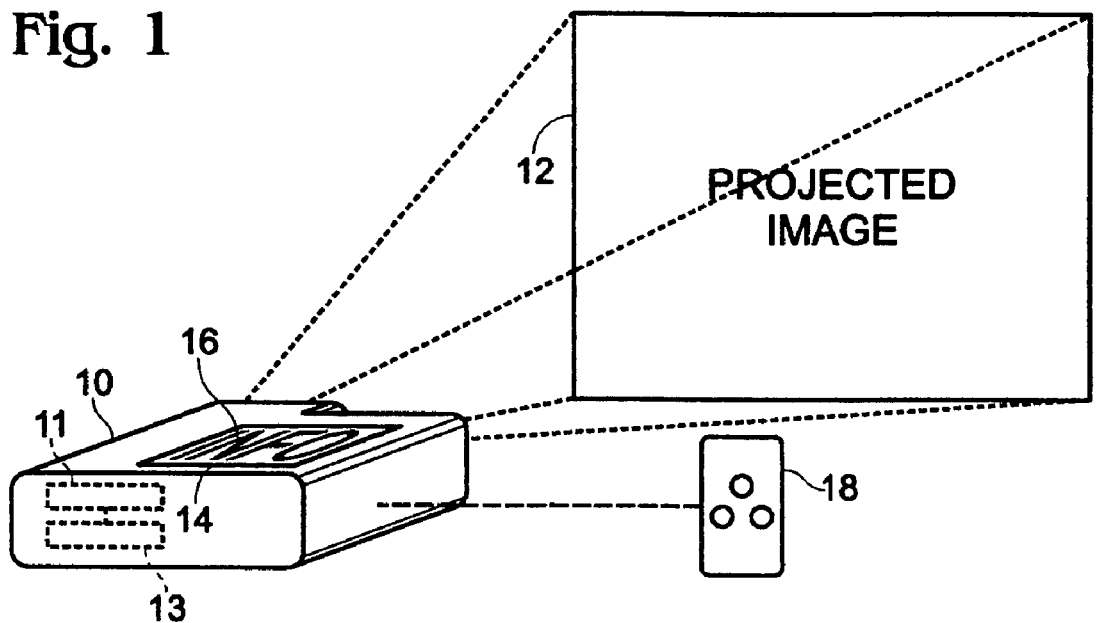
FIG. 1 is a schematic illustration of an exemplary projector assembly according to an embodiment of the present invention.

FIG. 1 depicts an exemplary embodiment of the present invention. As shown, a projection device 10 is adapted to project a presentation image 12. Presentation image 12 may be projected onto any suitable display surface, including, but not limited to, a screen, a wall, or other viewing surface or area.

Projection device 10 may be a projector or image-generating device that is able to project an image onto a display surface. As used herein, a projection device or image-generating device may include any suitable display device or image projector, including, but not limited to, a digital projector, a liquid crystal display (LCD) projector, a digital light processing projector, etc.

Projection device 10, in its most basic form, includes a processor 11 and memory 13. Although shown as resident on the projection device, it should be appreciated that the processor and memory described above may be resident on a linked computing device, such as a computer, portable computer, portable data assistant, server, camera, control unit, etc.

Processor 11 may take the form of a central processing unit (CPU), or other suitable controller for controlling operation of the projection device. Processor 11 thus may be configured to manage operation and function of the projection device. For example, processor 11 may manage operational programs, menu programs, user-interface programs, etc.

Memory 13 may include both volatile memory and non-volatile memory. Non-volatile memory may be utilized to store permanent or semi-permanent data. Such non-volatile memory may be any suitable type of non-volatile memory, including, but not limited to, ROM, PROM, EPROM, EEPROM and Flash memory, and combinations thereof. Volatile memory may be utilized to store temporary data, including images and instructions. Volatile memory may include one or more suitable types of volatile memory, such as SRAM or DRAM.

As described in more detail below, memory 13 of projection device may be configured to store any of the information and menus described herein. Processor 11 may be configured to operate the projection device such that a user-interface 14 (described in more detail herein) displays user-readable information 16 to a user.

User-interface 14 may be configured to provide a private (non-projected) display to a user. Various types of display information 16 may be displayed on the user-interface. The user-interface may be disposed on the body of the projection device. For example, the user-interface may be located on the top of the projection device, as shown in FIG. 1. Alternatively, the user-interface may be located at the back or on a side of the projection device. When the user-interface is disposed on the body of the projection device, it may be referred to as an "on-board" user-interface.

As a further alternative, the user-interface may be located remotely from the body of the projection device and be in electronic communication with the projection device via wired or wireless technology. For example, it should be appreciated that the user-interface may be disposed on a remote device such as remote controller. Moreover, the user-interface may take the form of, or be similar to, a compact computing device such as a laptop computer or Personal Data Assistant (PDA) that can communicate with the projection device via an attached cord, through Bluetooth™ wireless technology, via a modem, or in some other manner.

Moreover, a projection device may include more than one user-interface. For example, in some embodiments, it may be desirable to include a first user-interface disposed on the body of the projection device and a second remote user-interface that communicates with the projection device through Bluetooth™ wireless technology. The remote user-interface may be located, for example, on a remote controller, or other remote device User-interface 14 may include a display screen adapted to display user-readable information 16. The information 16 presented by user-interface 14 may take the form of text, graphic, and/or video images. In some cases, the user-interface may be capable of presenting pixelated images. The user-interface may be a Liquid Crystal Display (LCD) or any other suitable display.

User-interface 14 may be of any suitable size. For example, user-interface 14 may be a display adapted to display a single line of text. Alternatively, in other embodiments, user-interface 14 may be adapted to display graphical images, menus, and multi-line images.

A controller 18 may be linked with projection device 10. In some embodiments, controller 18 may be configured to allow a user to manage information displayed on user-interface 14. For example, and not as a limitation, a user may use controller 18 to turn the projection device off, in response to the user's selection, information regarding powering down the projection device may be displayed on the user-interface.

As stated above, user-interface 14 is adapted to display user-readable information regarding projection device 10. As non-limiting examples, the user-readable information may include set-up information and/or instructions, trouble-shooting information and/or instructions, status information, etc. Information related to operation of the projection device may be displayed on user-interface 14. In some embodiments, the user-interface may be a passive display.

In some embodiments, user-interface 14 may be an interactive display. For example, in some embodiments, a user may select and control the information displayed on user-interface 14. In some cases, it may be desirable to present some or all of the information in the form of a navigable menu 19, such as the exemplary menu shown in FIG. 2. A suitable method of menu presentation is described in co-pending U.S. patent application Ser. No. 10/438,612, filed on May 14, 2003, of Phillip H. Salvatori et al., entitled Method for Menu Navigation, which is hereby incorporated by reference in its entirety for all purposes.

Figure 2:
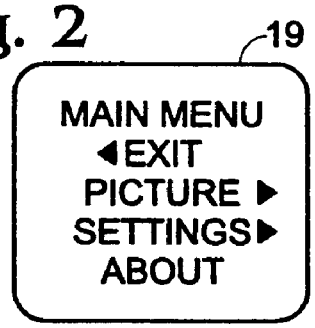
FIGS. 2-5 depict exemplary information according to embodiments of the present invention that might be displayed on the user-interface shown in FIG. 1.

The exemplary menu, shown in FIG. 2, may link with menus and selection boxes, which enable a user to change and alter settings. Such menus and selection boxes may be displayed on the user interface.

As described above, user interface 14 may display set-up information. Set-up information may include information and/or instructions describing how to set up the projection device and/or how to project images using the projection device. The set-up information may enable a user to view, select, and/or alter current settings for the projection device. For example, a given projection device may be capable of projecting images from multiple sources such as from a computer, Videocassette Recorder (VCR) or Digital Versatile Disc (DVD). As such, a user may desire to access and alter the settings depending on the current linked source in order to optimize viewing of the image.

As previously stated, user interface 14 also may present trouble-shooting information. Trouble-shooting information may include information and/or instructions that enable a user to attempt to solve or trouble-shoot a problem with the projection device or an associated accessory. The trouble-shooting information may include step-by-step instructions to aid a user in identifying and correcting a problem with operation of the projection device.

As mentioned above, user interface 14 further may present status information. Status information may include information and/or instructions regarding the current activity in which the projection device is engaged. Status information may further include, but is not limited to, information regarding a response to a user command, the current settings for the projection device, which accessories are attached or otherwise in communication with the projection device, whether any of the parts or accessories require maintenance and/or replacement, etc. For example, user-interface 14 may display text and/or graphics indicating that the lamp in the projection device needs replacement.

Figure 3:
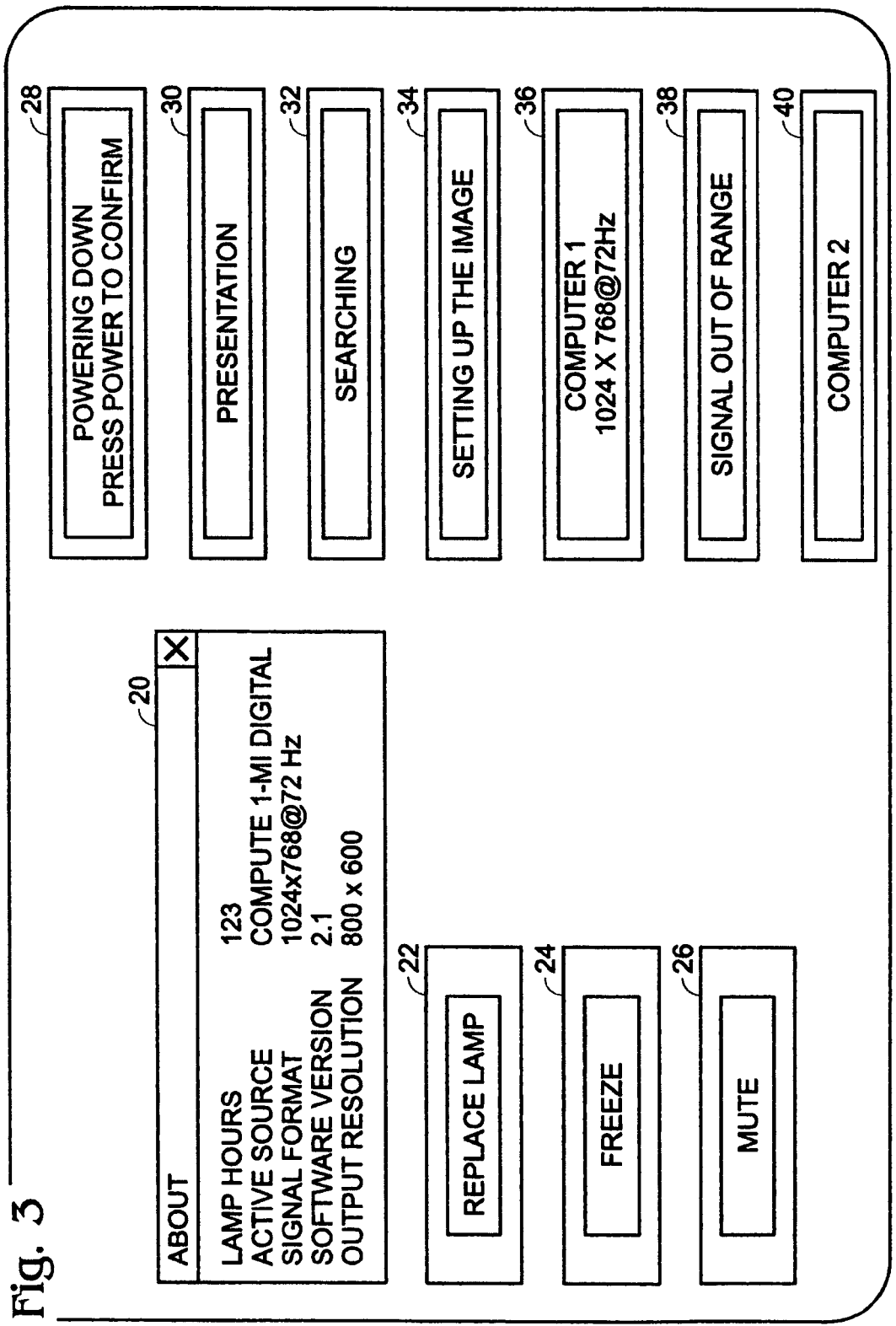

As examples, and not as limitations, user-interface 14 may be adapted to display one or more dialog boxes (or dialogs) under various conditions. Without wishing to be limited, exemplary dialog boxes are shown in FIG. 3 and described below. Each of these boxes, or other such dialogs, may be displayed on user interface 14. It should be appreciated that other types dialog boxes, other than those described, may be displayed without departing from the scope of the invention. Thus, although an "About" dialog box 20, a "Replace Lamp" dialog box 22, a "Freeze" dialog box 24, a "Mute" dialog box 26, a "Powering Down" dialog box 28, etc. are described in detail, it should be appreciated that other types of dialog boxes are possible and contemplated.

To aid in understanding the present invention, an "About" dialog box 20 may include information about the projection device. For example, the About dialog box may include information, such as the number of lamp hours used, the active source, the signal format, the software version, the output resolution, etc. This dialog box may appear on user interface 14 when the user chooses to view the "About" information and may be accessed independently or through a menu system displayed on the user interface.

Similarly, a user may be able to access and view a "Replace Lamp" dialog box 22 through user-interface 14. In some embodiments, a "Replace Lamp" dialog box 22 may appear during the power-up stage when the lamp has reached its replacement age and during any subsequent power-ups until the lamp is replaced. Typically, the "Replace Lamp" dialog box may appear for a given period of time, such as one minute. It should be appreciated that some dialog boxes may be set up such that they are difficult for a user to bypass. For example, the "Replace Lamp" dialog box may appear on the user-interface for a predetermined period of time and may be difficult for a user to bypass.

Other exemplary dialog boxes include a "Freeze" dialog box 24, which may appear when the projected image is frozen. Moreover, in some embodiments, a "Mute" dialog box 26 may appear the audio is muted. Similarly, in other embodiments, a "Powering Down. Press Power to Confirm." dialog box 28 may appear when the user selectively to turns the projection device off. Furthermore, a "Presentation" dialog box 30 may appear when the user presses a specific button, such as the "preset" button described in co-pending U.S. patent application Ser. No. 10/438,612, filed on May 14, 2003, of Phillip H. Salvatori et al., entitled Preset Key for a Projection Device, hereby incorporated by reference for all purposes.

Further exemplary dialog boxes include a "Searching . . . " dialog box 32, may appear during operation of the projection device. For example, the "Searching . . . " dialog box may appear when the projection device is trying to find an input signal. Moreover, a "Setting Up the Image" dialog box 34 may appear when the projection device is trying to lock onto an input signal. A Confirmation dialog box 36, indicating the signal source, such as "Computer 1 1024×768@72 Hz" may appear when the projection device locks onto an input signal. As a further example, a "Signal Out of Range" dialog box 38 may appear when the projection device is unable to lock onto a valid input signal. Likewise, a Confirmation dialog box 40 such as "Computer 2" may appear when the user selects or otherwise changes the input source.

Figure 4:
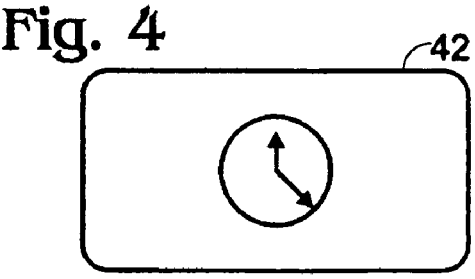

Alternatively, or additionally, user-interface 14 may include a timer 42, as shown in FIG. 4. For example, timer 42 may be adapted to present a countdown display. The countdown display may be intended to indicate when the projection device will be on-line, when the next image will appear, when input is expected from the user, time to shut down, power-up period, etc. As will be appreciated, the timer may be a graphical display, a numerical display and may be displayed in analog, digitized, or any other suitable user-interpretable format.

Figure 5:
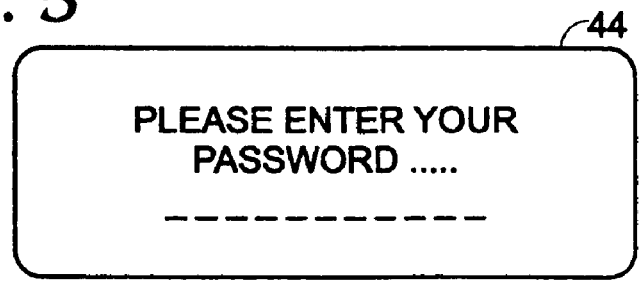

As a further addition or alternative, user-interface 14 may present the user with an opportunity to enter a password, as shown in dialog box 44 in FIG. 5. Password entry may provide access to the projection device itself, projection device sources, or to specific functions of the projection device.

It will be appreciated that any information including the dialogs described above may be presented to the user via the user-interface without projecting an image. Thus, by viewing the user-interface, the presenter may privately view a dialog, image, or message. Privately, as used herein, includes displaying an image viewable by a user on a user-interface of a projection device, without requiring projection of the image on a display surface. However, it should be understood that, in some embodiments, images viewed via the user-interface may be projected as a presentation image by the projection device, should it be desirable to do so.

As stated above, user-interface 14 may be capable of displaying an image or text that is, has been, or will be projected by projection device 10. For example, user-interface 14 may display a preview of the next image to be shown during a presentation, before it is projected. Furthermore, user-interface 14 may enable the presenter to alter the projection device's settings with regard to the next image so as to optimize presentation of the particular image, before the image is projected.

As briefly described above, controller 18 may be linked to the projection device. Controller 18 may be located on the body of the projection device or remotely, i.e. in a remote control. Thus, controller 18 may be integrated with the other controls for the projection device or may be separate. For example, controller 18 may be one or more buttons or other user-inputs located on the body of the projection device.

Typically, controller 18 enables a user to manage the information displayed on the user-interface. For example, controller 18 may allow a user to scroll through various menus, select options, change settings, or otherwise interact with the user-interface. Thus, as an illustrative example, a user may be requested via the user-interface for a password code. The request may be in the form of a dialog box displayed privately to the user via the user-interface. The user may operate controller 18 to input a password code, thus, providing access to the projection device.

Figure 6:
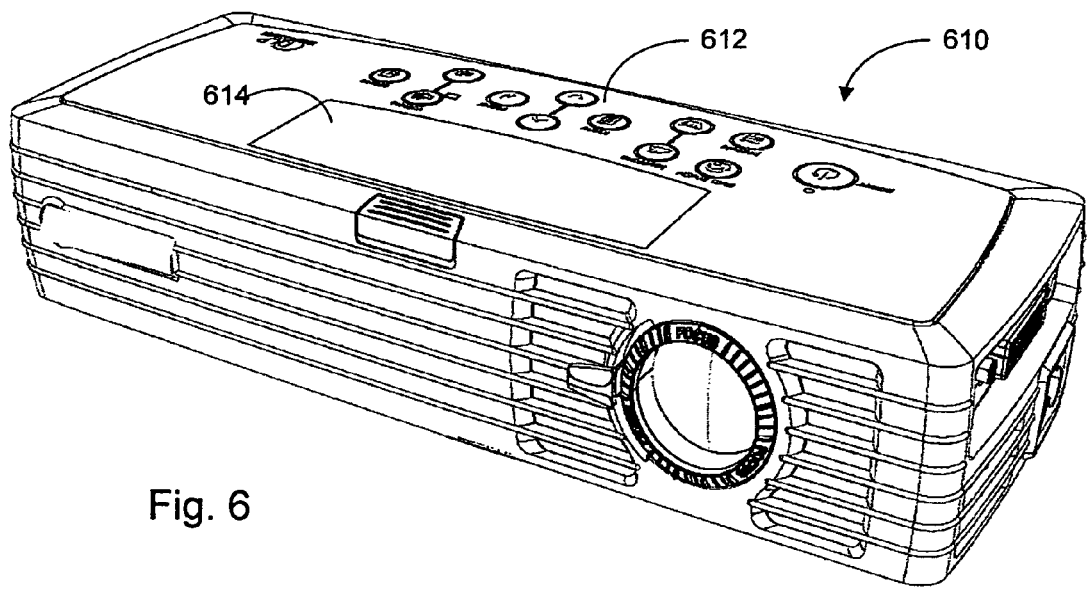
FIG. 6 shows a schematic illustration of an alternative projector assembly.

Another alternative embodiment is illustrated in FIG. 6. In this example, an alternative projector configuration is presented by projection device 610. Like projection device 10, projection device 610 may be adapted to project a presentation image, such as image 12 of FIG. 1. Also like projection device 10, projection device 610 may be a projector or image-generating device that is able to project an image onto a display surface, and may, in its most basic form, include a processor, memory, and user interface. Further, projection device 610 may be substituted in the above system or configurations using projection device 10, if desired.

Projection device 610 may include a user interface as described above. In addition to the user interface (interface shows as touch pad 614), projection device 610 may further include a keypad 612. In this example, touchpad 614 may operate as a user-input device (for example, a user may input information via touch to a selected region of said touchpad). Touchpad 614 may further include a display. In one example, sensors may be produced when contact region of contact within the touchpad by the user may be sensed and may be used to identify which option displayed on the user-interface a user selected. For example, virtual buttons or virtual keys may be used to indicate to the user where the user should touch the touchpad in order to provide input information and/or achieve a certain function or action.

The user-interface of 614 may also be configured to provide a private (non-projected) display to a user. As noted above, various types of display information may be displayed on the user-interface. Also, as shown in FIG. 6, the touchpad 614 and/or keypad 612 may be disposed on the body of the projection device, such as, for example, they may be located on the top of the projection device. Alternatively, the touchpad 614 and/or keypad 612 may be located at the back or on a side of the projection device. When the touchpad is disposed on the body of the projection device, it may be referred to as an "on-board" touchpad.

As a further alternative, the touchpad 614 (and/or keypad 612) may be located remotely from the body of the projection device and be in electronic communication with the projection device via wired or wireless technology. For example, it should be appreciated that the touchpad and/or keypad may be disposed on a remote device such as remote controller. Moreover, the touchpad and/or keypad may take the form of, or be similar to, a compact computing device such as a laptop computer or Personal Data Assistant (PDA) that can communicate with the projection device via an attached cord, through Bluetooth™ wireless technology, via a modem, or in some other manner.

Moreover, a projection device may include more than one touchpad. Touchpad 614 typically includes a display screen adapted to display user-readable information, as well as be adapted to receive input from a user's touch. Information presented by touchpad 614 may take the form of text, graphic, and/or video images. In one example, virtual buttons may be generated to provide options for a user to select, such as a menu as described above herein. In some cases, the touchpad 614 may be capable of presenting pixelated images. The touchpad 614 may be a Liquid Crystal Display (LCD) or any other suitable display or input receiving device. Further, in one example, touchpad 614 may be used without keypad 612, if desired. For example, projection device 610 may be manufactured and operated without a keypad, such as the examples of FIG. 1 and FIG. 7.

Touchpad 614 may be of any suitable size. For example, touchpad 614 may be a display adapted to display a single line of text or selection buttons. Alternatively, in other embodiments, touchpad 614 may be adapted to display graphical images, menus, and multi-line images.

As noted above with regard to FIG. 1, a controller may also be linked with projection device 610, such as controller 18.

As stated above, touchpad 614 is adapted to display user-readable information regarding projection device 610. As non-limiting examples, the user-readable information may include set-up information and/or instructions, troubleshooting information and/or instructions, status information, menus, selection options, projection device operation modes, etc. Information related to operation of the projection device may be displayed on touchpad 614. In some embodiments, touchpad 614 may be or include a passive display and passive input device.

In some embodiments, touchpad 614 may be an interactive display and input device. For example, in some embodiments, a user may select and control the information displayed on the projection device 610 and touchpad 614. In some cases, it may be desirable to present some or all of the information in the form of a navigable menu, such as the exemplary menu shown in FIG. 2. A suitable method of menu presentation is described in co-pending U.S. patent application Ser. No. 10/438,612, filed on May 14, 2003, of Phillip H. Salvatori et al., entitled Method for Menu Navigation, which is hereby incorporated above.

In some embodiments, touchpad 614 may provide flexibility in function and operation. For example, different levels of menus and controls for different devices may be provided with a common structure, since the display and input/menu options may be varied with changing algorithms, rather than physical buttons of a keypad. In one example, reconfigurable menus and virtual option buttons may be provided via touchpad 614. Further, the touchpad may enable different functionality for different price levels of devices and without requiring different hardware. Thus the user interface may be considered to be universal to devices across a product marketing line.

Likewise, a touchpad may provide more universal operation than a keypad, such as the ability to enable operation with different languages. For example, virtual buttons may be provided on the touchpad with their respective function in a selectable language. Further still, a touchpad may provide improved ability for updating, since a new user-interface may be provided via new programming, without requiring physical alteration (although such physical alteration may be used, if desired).

Figure 7:
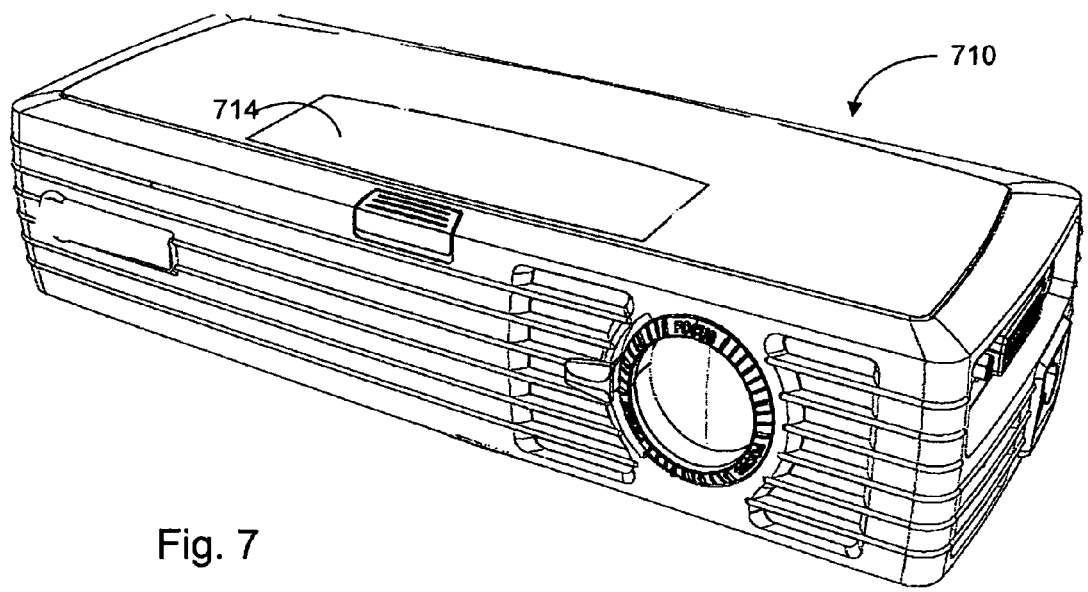
FIG. 7 shows a schematic illustration of another alternative projector assembly.

Referring now to FIG. 7, another example embodiment is shown in without a keypad (similar to FIG. 1). However, in this example, a touchpad 714 is included. Specifically, in this example, projection device 710 is shown that is similar to that described with regard to FIG. 6, except that there is no keypad in this example. The remaining features of this example are similar to that described with regard to FIG. 6.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A projector assembly comprising:
a projection device adapted to project an image; and
an interactive display in communication with the projection device, wherein the interactive display is adapted to privately present user-readable information to a user and wherein the interactive display is adapted to receive input from said user to control said projection device, where at least a portion of the interactive display that presents information also receives input.

2. The projector assembly of claim 1, wherein the interactive display is disposed on a body of the projection device.

3. The projector assembly of claim 2, wherein the interactive display includes a touchpad.

4. The projector assembly of claim 3, wherein the projector assembly is without a keypad.

5. The projector assembly of claim 3, wherein the interactive display presents a menu.

6. The projector assembly of claim 3, wherein the interactive display presents multiple levels of user-input selectable options.

7. The projector assembly of claim 6, wherein the interactive display presents reconfigurable touch inputs depending on the level.

8. The projector assembly of claim 3, wherein the interactive display is adapted to display information regarding operation of the projection device.

9. The projector assembly of claim 3, wherein the interactive display presents project ion device status information.

10. The projector assembly of claim 1, wherein the interactive display comprises a Liquid Crystal Display (LCD).

11. The projector assembly of claim 1, wherein the interactive display selectively presents virtual buttons that are mapped to projector controls.

12. A projector assembly comprising:
a projection device having a body, the projection device adapted to project an image; and
an interactive display disposed on the body of the projection device, the interactive display being adapted to display user-readable information regarding operation of the projection device, the interactive display further adapted to receive input from a user so that the user can provide input information to the projection device.

13. The projector assembly of claim 12, wherein the interactive display includes a touchpad, and said user inputs information via said touchpad.

14. The projector assembly of claim 13, wherein the projector assembly is without a keypad.

15. The projector assembly of claim 13, wherein the interactive display includes a reconfigurable menu.

16. The projector assembly of claim 13, wherein said touchpad is adapted to allow a user to manage the information displayed on the interactive display.

17. The projector assembly of claim 16, wherein the information includes information that is related to the set-up of the projector device.

18. The projector assembly of claim 16, wherein the information includes information that is related to troubleshooting the projection device.

19. The projector assembly of claim 12, wherein the displayed information includes a navigable menu.

20. A method for providing access to information and receiving information from a user regarding operation of a projection device, the method comprising:

displaying information about the projection device on an interactive display, wherein the interactive display is disposed on the body of a projection device;

receiving input information from the user via the interactive display; and controlling the projection device based on said input information.

21. The method of claim 20, wherein the interactive display is further adapted to allow a user to alter at least some settings on the projection device.

* * * * *

UNITED STATES PATENT AND TRADEMARK OFFICE
CERTIFICATE OF CORRECTION

| | | |
|---|---|---|
| PATENT NO. | : 7,290,885 B2 | Page 1 of 1 |
| APPLICATION NO. | : 11/126940 | |
| DATED | : November 6, 2007 | |
| INVENTOR(S) | : Phillip H. Salvatori et al. | |

It is certified that error appears in the above-identified patent and that said Letters Patent is hereby corrected as shown below:

Title Page, In section (*) Notice:

After "Subject to any disclaimer, the term of this patent is extended or adjusted under 35 U.S.C. 154(b) by 142 days" insert -- This patent is subject to a terminal disclaimer --

Signed and Sealed this

Twenty-seventh Day of October, 2009

David J. Kappos
*Director of the United States Patent and Trademark Office*